United States Patent [19]

Hoddinott

[11] 4,295,812

[45] Oct. 20, 1981

[54] RIBBON CABLE EXTRUSION CROSSHEAD

[75] Inventor: David C. Hoddinott, Preston, Conn.

[73] Assignee: Crompton & Knowles Corporation, New York, N.Y.

[21] Appl. No.: 160,416

[22] Filed: Jun. 18, 1980

[51] Int. Cl.³ .............................................. B29F 3/10
[52] U.S. Cl. .................................. 425/114; 264/174; 425/462; 425/466
[58] Field of Search ............... 425/114, 113, 466, 462; 264/172, 174

[56] References Cited

U.S. PATENT DOCUMENTS

| | | | |
|---|---|---|---|
| 2,105,812 | 1/1938 | Gordon et al. | 425/114 |
| 2,893,056 | 7/1959 | Henning | 425/113 |
| 2,902,083 | 9/1959 | White | 425/114 |
| 3,758,247 | 9/1973 | Deegen | 425/114 |
| 3,813,199 | 5/1974 | Friesner | 425/113 |
| 4,150,929 | 4/1979 | Brandt | 425/114 |
| 4,165,957 | 8/1979 | Kertscher | 425/113 |

Primary Examiner—Jeffery R. Thurlow

[57] ABSTRACT

Ribbon cable extrusion crosshead comprising a die having interconnected extrusion passages and a guide block provided with wire guiding holes axially aligned with the passages. Top and bottom distribution channels are located, respectively, above and below the die and are connected to an inlet bore by top and bottom feed bores, respectively. Upper and lower flow channels intersect at the openings of the die passages and extend across the full width of the sheet of wires extending from the guide block to the die. Top and bottom flow compensating channels, connect the top and bottom flow channels, respectively, to the top and bottom distribution channels, respectively.

8 Claims, 10 Drawing Figures

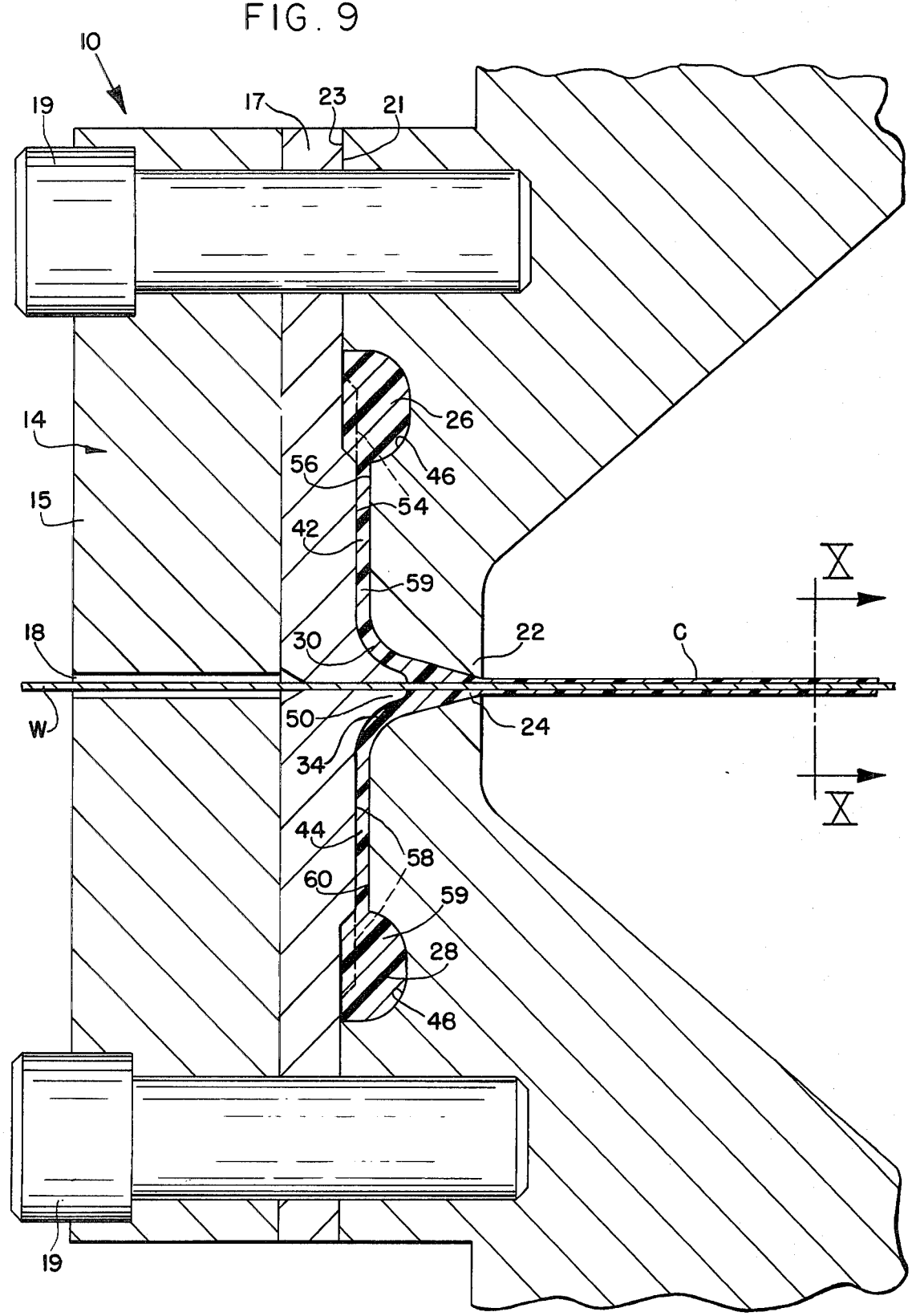

RIBBON CABLE EXTRUSION CROSSHEAD

BACKGROUND OF THE INVENTION

This invention relates to apparatus for making flat or ribbon cables, particularly ribbon cables which comprise a large number of spaced, parallel fine conductor wires encased in insulation material. Wire diameters for this type of cable typically range between 0.010 to 0.020 inches and may include as many as 50 conductors in a ribbon of less than 3 inches.

Ribbon cables are formed in a crosshead having a die which includes a plurality of interconnected die passages for the wires. The crosshead includes a guide block having a plurality of holes axially aligned with the guide passages in the die for guiding the wires into the die. Plasticized or molten insulating compound enters the crosshead from an extruder and flows along appropriate channels to the die in two separate flat streams, one below and one above the array or sheet of wires. As the wires and plasticized insulating material pass through the die, the wires are completely encased to form the finished ribbon cable. The molten insulating material enters the crosshead from the extruder along an axis which is at a substantial angle to the axes of the wires, as much as 90°. Therefore, the flow of the molten or plasticized material must be diverted to the axes of the wires. This creates many problems, since any change in the direction of material flow from a first plane to a second plane that is transverse to the first plane, results in different flow paths for individual cross-sectional increments across the width of the stream of plasticized material. The outer portion of the stream must travel a greater distance that the inner portion. These flow path differences lead to differences in the physical conditions of the plastic compound such as pressure, velocity, temperature, and viscosity. These differences result in non-uniform thickness across the width of the ribbon cable. Because of the great precision required in its use, a non-uniform ribbon cable is unacceptable by the trade in which it is used. In the past, this problem had been partially solved by providing compensating elements such as core pieces or deceleration fittings which alter the flow paths so that the flow path of the material in the inner arc is similar to that in the outer arc.

One mechanism for diverting the flow of insulating material emanating from the extruder from along a first axis to a second transverse axis extending through the die in the crosshead is shown in U.S. Pat. No. 3,758,247 to Deegan, issued Sept. 11, 1973. This patent shows a crosshead die for a ribbon cable in which the flow of insulating material from the extruder is divided into an upper and a lower stream, each of which passes through a helical groove in a diversion roller. The cross-section of each divided stream of insulating material is made rectangular while following along a first path that is generally parallel to the longitudinal axis of the extrude prior to reaching the diversion roller. The helical groove in the diversion roller is rectangular in cross-section and causes the stream of insulating material to be diverted from the first path to a second path that is transverse to the first path and parallel to the array or sheet of conductor wires. The upper and lower streams of insulating material thereafter converge against the wires at the point where the wires enter the die so that the insulating material and wires pass through the die together to form a flat cable.

A major problem encountered in the production of ribbon cable is the clogging of the wire guide holes in the guide block due to the back flow of the plasticized insulating material into the guide block after a wire breaks. The clogging of the wire guide holes prevents reinsertion of a wire into the hole. The broken wire must be removed, the guide hole cleaned and the wire re-inserted through the guide hole into the die. This is extremely difficult to do because of the fineness of the wire. The problem is compounded by the fact that the wire guide holes in the prior art crossheads must be of considerable length because of the space required to divert the flow of material from one axis to another. Eventually, the entire prior art crosshead must be disassembled for cleaning all of the guide holes and the wires re-threaded after assembly.

U.S. Pat. No. 4,150,929 to Brandt, issued Apr. 24, 1979 represents an attempt to solve the clogging problem by providing tubular guide sleeves in the guide block. The guide tubes are necked-down close to the external diameter of the wires near the end of the guide block. However, since the conductor wires are extremely fine and the guide holes approximately 5" long, threading of the wires into the die is very difficult. For a given wire diameter and for a given material, the stiffness of the wires is greatly reduced by increasing the length required to fully insert the wire into the crosshead. Also, most conductor wires are formed from material which is not very stiff to begin with, such as copper. In addition to the difficulties in threading the conductor wires into the crosshead, the use of guide tubes does not entirely eliminate backflow and creates greater problems when the guide tubes become clogged. The guide tubes have to be removed by pliers or the like because the plastic acts to glue the tubes into the crosshead. Since the conductor wires are fine, the guide tubes are also fine and delicate and easily damaged during removal. After removal of the guide tubes, the guide holes must be cleaned and this is still difficult to do because of the narrowness and length of the holes.

None of the prior art crossheads have completely solved the problem of uneven compound flow and clogging up of the guide holes for the wires.

Accordingly, it is the principle object of the present invention to provide a crosshead die for ribbon cable which eliminates the problem of uneven compound flow and minimizes the problem of clogging of the guide holes for the insulating wire.

Another object of the present invention is to provide a crosshead for ribbon cable which greatly facilitates insertion of the wires and is easily cleaned.

A further object of the invention is to provide a crosshead for ribbon cable in which the length of the wire guide holes is greatly reduced, to about 1" long.

SUMMARY OF THE INVENTION

According to the present invention, the crosshead includes a top distribution channel located above the die and a bottom distribution channel located below the die. The flow of plasticized insulating material from the extruder is divided into top and bottom feed bores connected to the top and bottom distribution channels, respectively. The wires to be coated enter the crosshead through guide holes which are axially aligned with the guide passages in the die. Upper and lower flat flow channels intersect at the guide passages of the die and extend along the full width of the sheet of wires entering the die. Top and bottom flow compensating passages connect the top and bottom distribution channels, respectively, to the upper and lower flow channels, respectively. Each flow compensation passage is flat and is effective to provide an even flow of plasticized insulating material to its respective flow channel. More specifically, the axis of each distribution channel is transverse to the axes of the wires and extends at an angle to the plane of a sheet of wires, so that one end of the distribution channel is closer to the sheet of wires than the opposite end thereof. The plasticized insulating material enters the opposite end of the distribution channel. Each flow compensating passage extends in a plane that is approximately at a right angle to the plane of the sheet of wires. Since the flow compensation is done at approximately right angle to the sheet of wires, the length required for compensation doesn't add any length to the wire guide holes.

BRIEF DESCRIPTION OF THE DRAWINGS

The character of the invention, however, may be best understood by reference to one of its structural forms, as illustrated by the accompanying drawings, in which:

FIG. 9 is an enlarged fragmentary view of the sectioned structure shown in FIG. 5, showing the wire and insulating material.

DETAILED DESCRIPTION OF THE INVENTION

Figure 1:
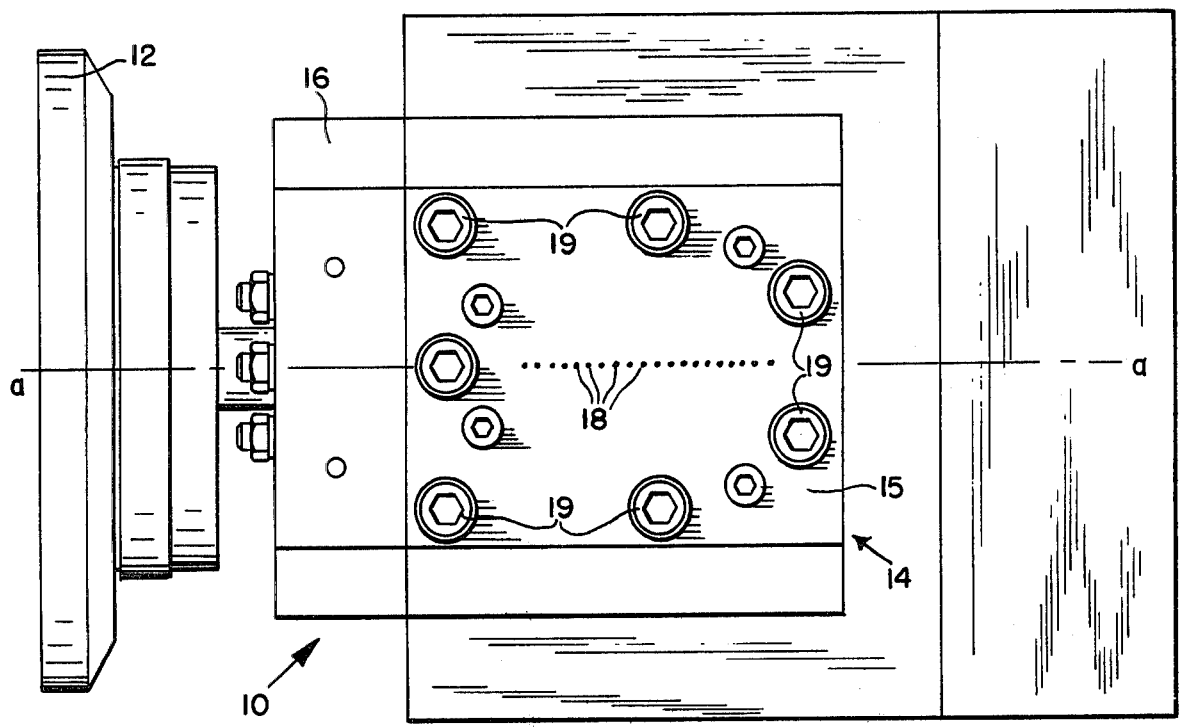
FIG. 1 is a front elevational view of an extrusion crosshead embodying the principles of the present invention shown attached to an extruder.
Figure 2:
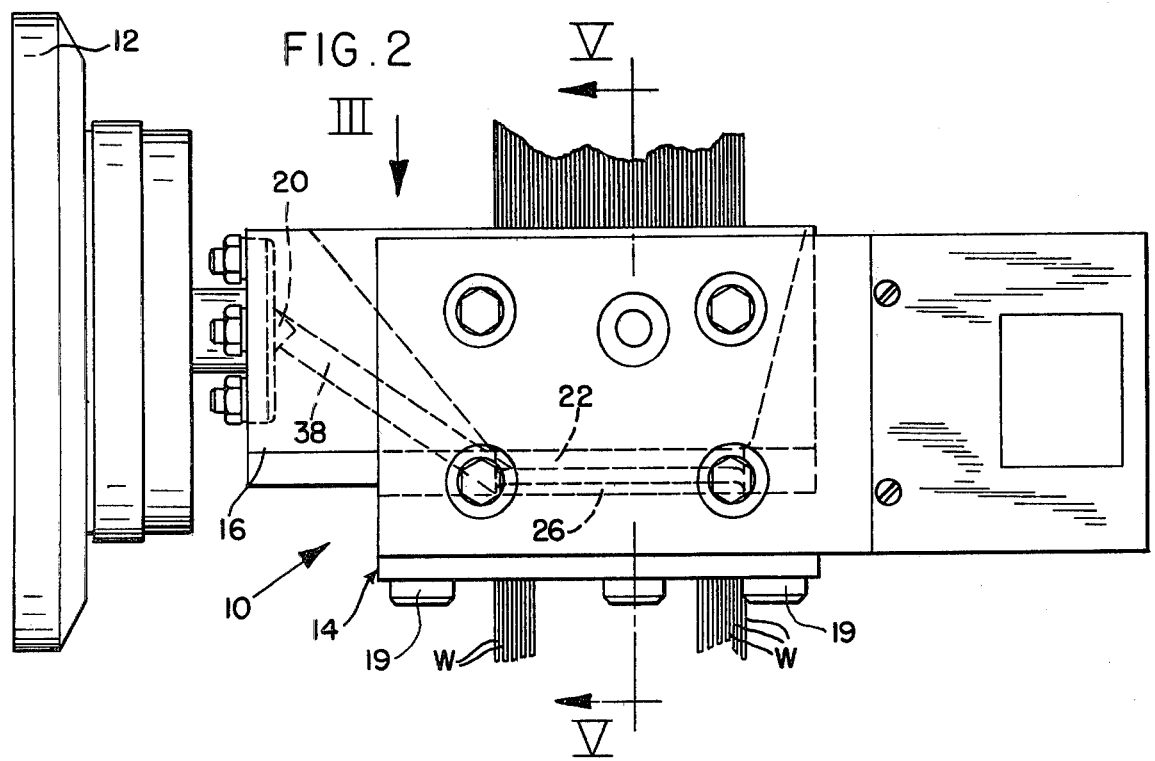
FIG. 2 is a plan view thereof.
Figure 3:
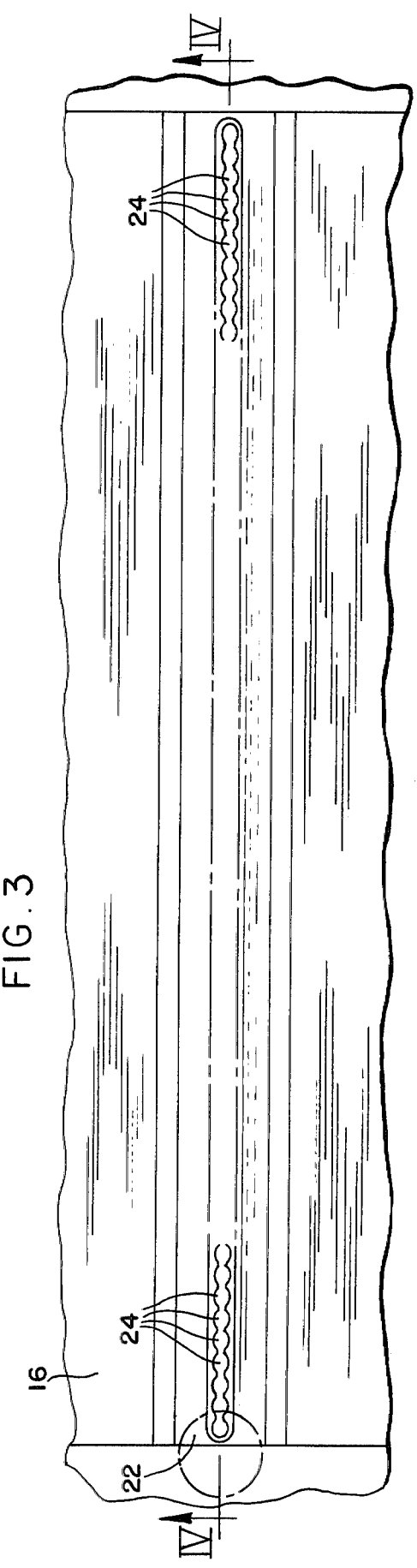
FIG. 3 is a fragmentary rear elevation of the extrusion crosshead looking in the direction of arrow III of FIG. 2.
Figure 4:
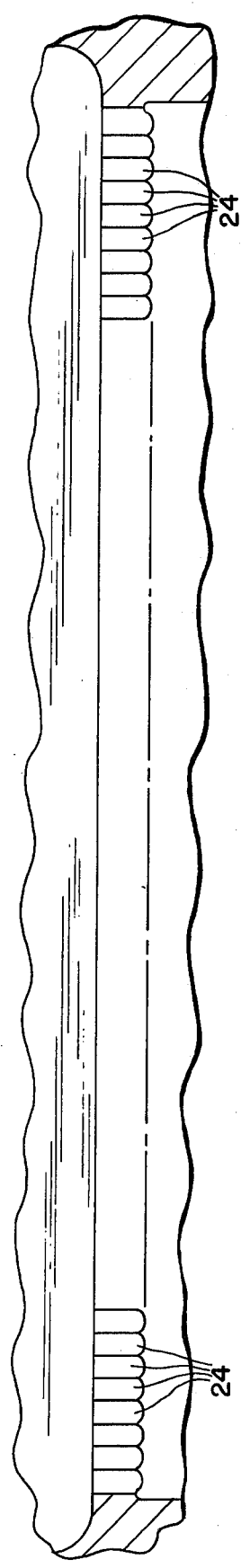
FIG. 4 is a fragmentary horizontal section taken along the line IV—IV of FIG. 3, and looking in the direction of the arrows.

Referring particularly to FIGS. 1 and 2, the extrusion crosshead of the present invention is generally indicated by the reference numeral 10, and is shown connected to the outlet end of an extruder 12. Extrusion crosshead 10 comprises a guide block 14 and a die block 16. Guide block 14 has a plurality of parallel guide holes 18 lying in a horizontal plane. The axes of guide holes 18 extend at a substantial angle to the extruder axis a—a as shown in FIG. 1. Plasticized or molten insulating material is delivered from extruder 12 and enters guide block 14 through an inlet port 20.

Figure 5:
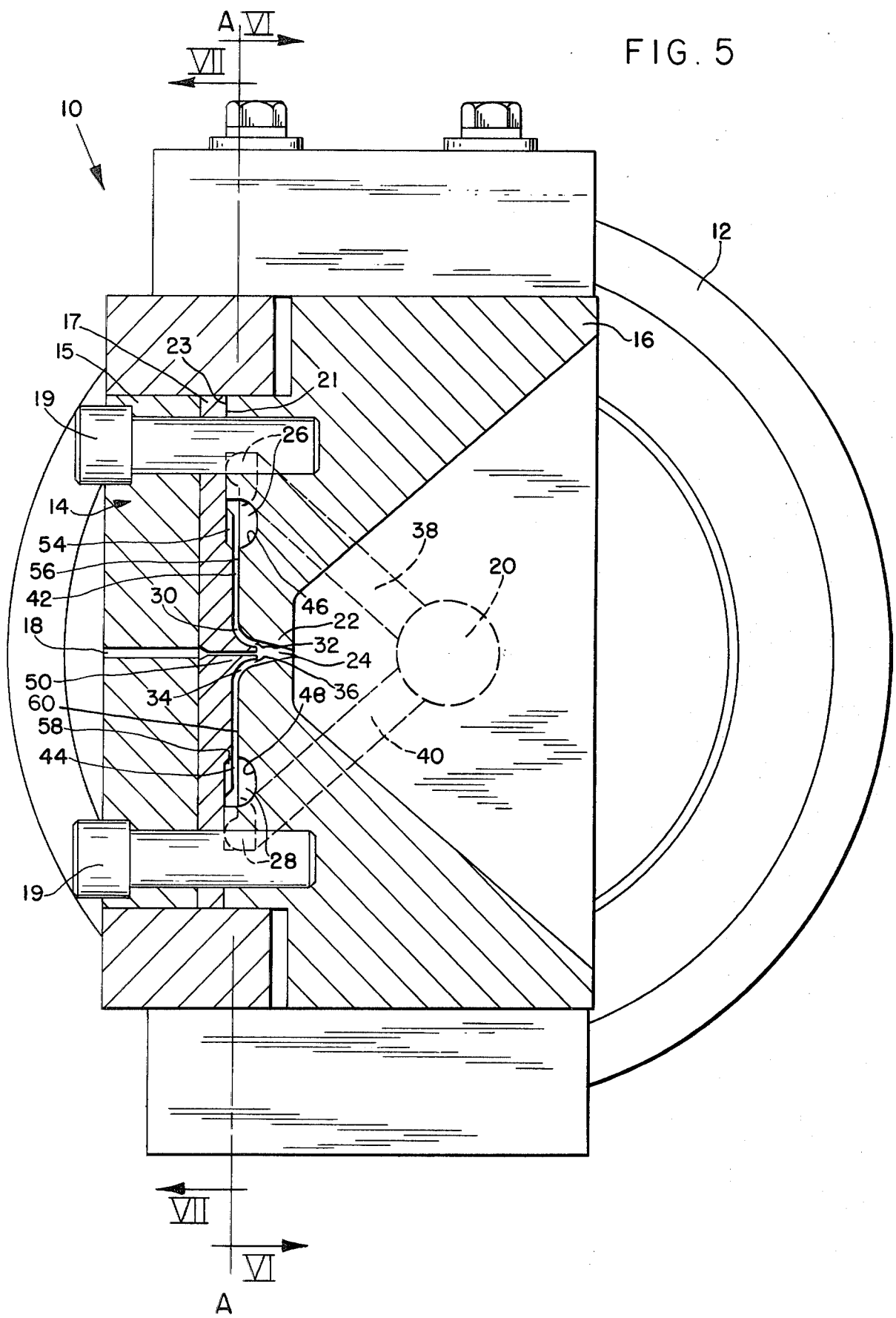
FIG. 5 is a vertical sectional view of the extrusion crosshead taken on the line V—V of FIG. 2 and looking in the direction of the arrows.

Referring to FIGS. 2 and 5, guide block 14 comprises an outer plate 15 and an inner plate 17 fastened as a unit to die block 16 by the bolts 19. Guide holes 18 extend through plates 15 and 17 as continuous holes. However, the portions of holes 18 extending through plate 15 have a substantially larger diameter than the conductor wires. The portions of holes 18 extending through plate 17 are necked down to a diameter very close to the wire diameter.

Referring to FIGS. 3-7, die block 16 includes a die 22 having a plurality of interconnected extrusion passages 24. Passages 24 are located in a horizontal plane and are axially aligned with guide holes 18. As shown in FIG. 5, the opposing vertical surfaces 21 and 23 (shown in elevation in FIGS. 7 and 6, respectively) of guide block 14 and die block 16, respectively, lie, for the most part, in a vertical plane A—A. Surfaces 21 and 23 are contoured to form therebetween a top distribution channel 26 and a bottom distribution channel 28. An upper flow channel 30 has an outlet opening 32 and a lower flow channel 34 has an outlet opening 36. Openings 36 and 32 intersect between guide holes 18 and extrusion passages 24. A top feed bore 38 connects inlet bore 20 to top distribution channel 26 and a bottom feed bore 40 connects inlet bore 20 to bottom distribution channel 28. A top flow compensating passage 42 extends vertically from top distribution channel 26 to upper flow channel 30. A bottom flow compensating passage 44 extends vertically from bottom distribution channel 28 to lower flow channel 34.

As used throughout the specification, the terms top, upper, bottom, lower, vertical and horizontal are relative terms to describe the orientation of the various elements with respect to each other. The invention is not limited to a particular spatial orientation of the elements except in the manner that each element is disposed with respect to the other elements. However, the particular orientation shown and described is the preferred one.

Figure 6:
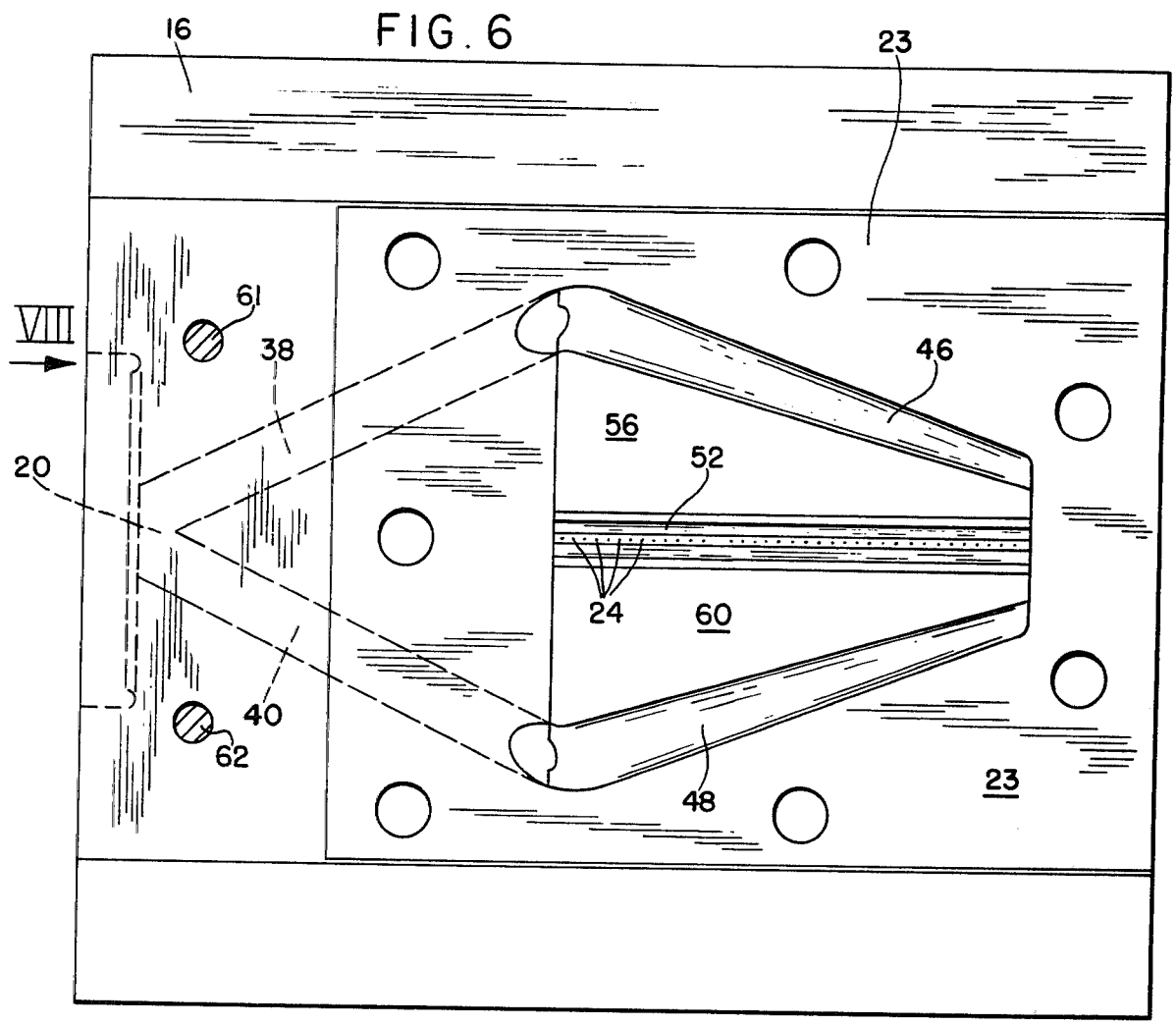
FIG. 6 is a front elevational view of the extrusion die block showing the contoured surface of the die block which lies generally in the vertical plane A—A of FIG. 5 and looking in the direction of the arrows VI.
Figure 7:
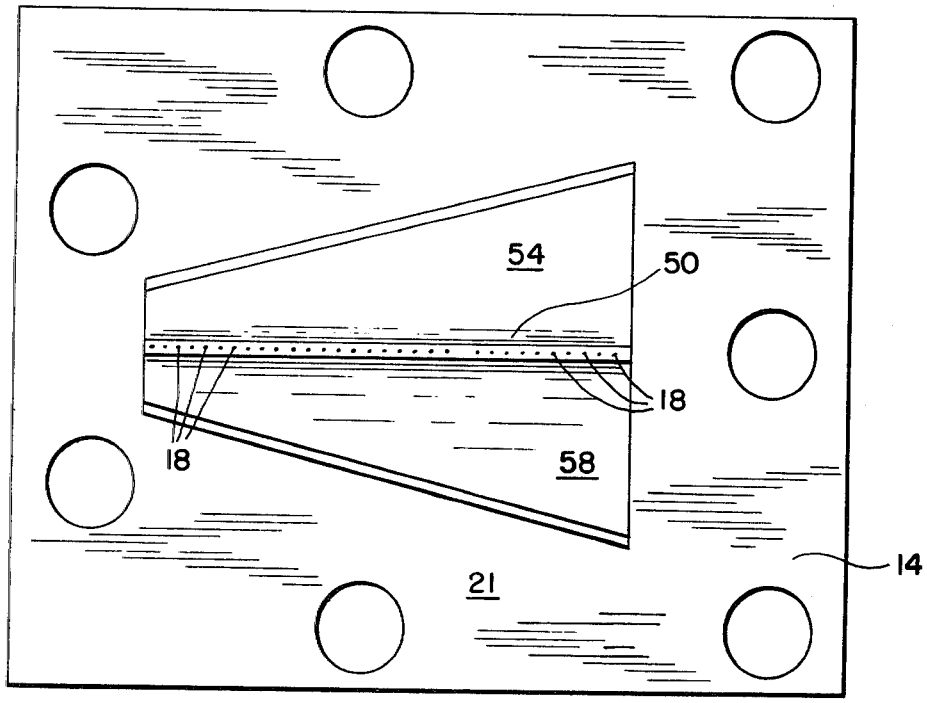
FIG. 7 is a rear elevational view of the guide block for the conductor wires looking in the direction of arrows VII of FIG. 5 and showing the contoured surface of the guide block which lies generally in the vertical plane A—A of FIG. 5.
Figure 8:
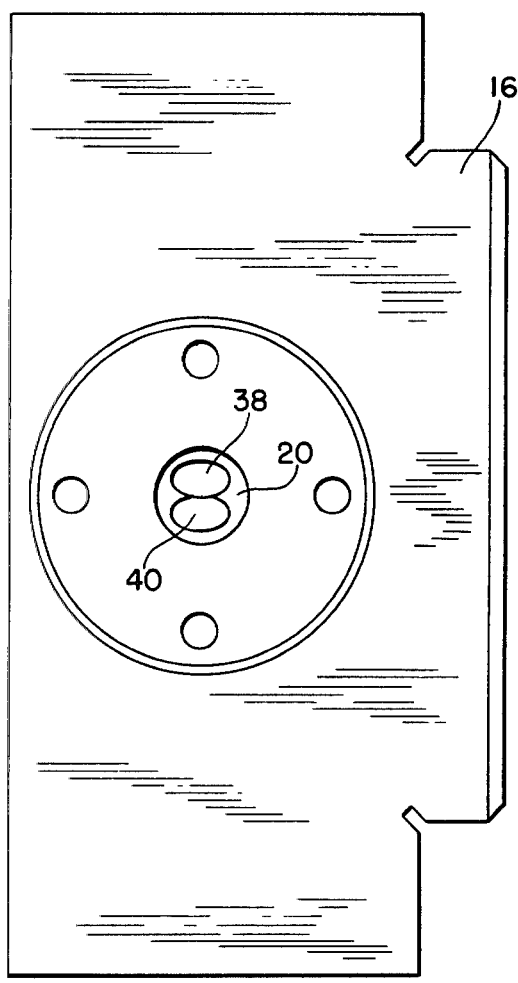
FIG. 8 is an end elevation of the die block looking in the direction of arrow VIII of FIG. 6.

Referring particularly to FIGS. 5, 6, and 7, top and bottom channels 26 and 28 are formed primarily by the upper and lower deep grooves 46 and 48, respectively, in surface 23 of the die block. Upper and lower flow channels 30 and 34 are formed between a central high ridge 50 in surface 21 and a central deep groove 52 in surface 23. Top flow compensating passage 42 is formed between an upper flat ridge 54 extending from surface 21 and an upper shallow depression 56 in surface 23. Bottom flow compensating passage 44 is formed between a flat lower ridge 58 extending from surface 21 and a lower shallow depression 60 in surface 23.

As shown in FIG. 6, grooves 46 and 48 extend at an angle to the horizontal plane of the extrusion passages 24, so that one end of each groove is closer to the die passages than the opposite end of the groove. Top and bottom feed bores 38 and 40, respectively, are connected to the opposite ends of grooves 46 and 48, respectively. This means that the flow compensating passages 42 and 44 gradually diminish in length between their respective distribution channels and their respective flow channels between the opposite ends of the distribution channels 26 and 28 where the plasticized insulating material first enters the distribution channels to the terminal ends of the distribution channels closest to the flow channels. Grooves 46 and 48 are shown widest at the ends connected to feed bores 38 and 40, respectively, and gradually diminish in width toward their outer ends. Each distribution channel 26 and 28 gradually diminishes in cross-sectional area from its inlet end to its outlet end. The dimensioning of the flow distribution channels and flow compensating passages is such that the upper and lower flow channels receive a uniform flow of plasticized material.

Figure 10:
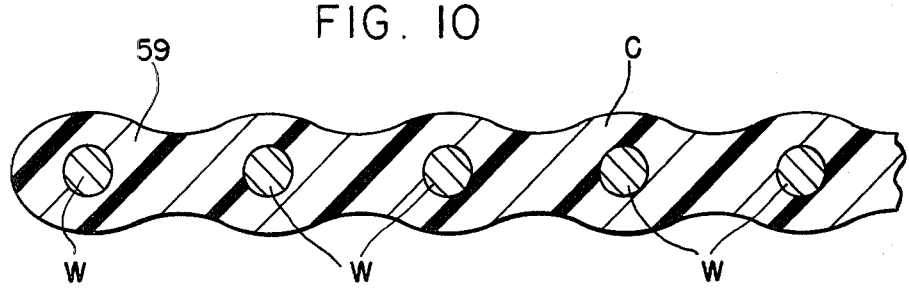
FIG. 10 is an enlarged vertical sectional view of the ribbon cable taken along line X—X of FIG. 9 and looking in the direction of the arrows.

The insulating material is shown in FIG. 9 and is indicated by the reference number 59. The uniform velocity and pressure of the plasticized material flowing through the upper and lower flow channels 30 and 34, respectively, provide a uniform coating of insulating material about the conductor wires W extending through the die. As shown in FIG. 2, the wires enter guide block 14 as a horizontal sheet and leave the die as a flat ribbon cable C in which each wire is completely encapsulated by insulating material 59, see FIG. 10. The design of the top and bottom flow compensating passages 42 and 44, respectively, utilize many of the principles normally employed in the flow of plasticized material evenly across the entire width of the sheet. Upper and lower flow channels 30 and 34 gradually change the vertical flow of material from the flow compensating passages to a horizontal flow at the point where outlet openings 32 and 36 intersect between guide holes 18 and extrusion passages 24.

Die 22 is shown integrally formed with the die block 16. However, die 22 may be formed as a separate unit so that the die may be easily replaced for cleaning or to be replaced by a die having a different passageway configuration.

Die block 16 also includes a pair of calrod heating units 61 and 62 located adjacent feed bores 38 and 40, respectively. Heating units 61 and 62 are individually controlled to selectively heat the plasticized material flowing through feed bores 38 and 40, so that the flow characteristics through the bores can be equalized.

The operation and advantages of the present invention will now be readily understood in view of the above description.

The production of ribbon cable involves a complex handling of the insulating material and the conductors. Four distinct operations have to be performed on the plasticized insulating material and the wires must be guided and located centrally of the die passages. First, the direction of flow must be changed to a substantial degree, as much as 90°. Secondly, the flow of material must be divided into two streams, an upper stream and a lower stream. The third operation is to change the flow of material in each divided stream from a cylindrical stream to a flat stream. The fourth operation is to provide a uniform flow of material across the width of the flat stream.

One of the reasons that prior art ribbon cable crossheads have experienced difficulties is that they have tried to deal with two or more of the various phases of insulating material flow simultaneously.

In the present application, the flow of material from the extruder is first divided into upper and lower streams by upper and lower bores 38 and 40, respectively. The distribution channels 26 and 28 distribute the plasticized insulating material from upper and lower cylindrical flow streams to upper and lower flat streams. Each flow compensating passage 42 and 44 provides a uniform flow of material to its respective flow channel across the width of the flat stream.

Upper and lower flow channels 30 and 34 gradually convert the flat vertical and uniform flow of plasticized material from flow compensating passages 42 and 44, respectively, into upper and lower horizontal flat streams, respectively. Since the insulating material enters each of the flow channels as a flat even flow of material that extends across the entire width of the wire sheet, the flow channel has to deal only with a change in direction of the flow stream that is uniform across the width of the stream. Since this single function can be accomplished very easily and quickly, the length of the flow channel is very short. Therefore, guide holes 18 in the guide block have a very short length.

The short length of guide holes 18 provide several advantages. In addition to the advantage of greater ease in inserting the conductor wires through the guide holes and die passages, replacement of broken wires and cleaning of the guide holes is greatly facilitated. Another advantage provided by the shorter guide holes is that the holes are more precisely located with respect to the guide passageways in the die. In drilling the holes, the shorter drilling length results in greater accuracy in aligning the holes axially with the extrusion passages of the die. This accuracy eliminates the need for adjusting means normally employed for shifting the die laterally of the plane of the wire sheet to align the extrusion passages with the guide holes.

The invention having been thus described, what is claimed as new and desired to secure by Letters Patent is:

1. An extrusion crosshead for encapsulating a sheet of parallel co-planar conductor wires with plastic insulating material, said extrusion head comprising:
   (a) an extrusion die having a plurality of interconnected extrusion passages dimensioned to accommodate the sheet of conductor wires, each extrusion passage having an inlet opening to receive a conductor wire;
   (b) a guide-block having a plurality of holes axially aligned with the die passages for receiving the wires and guiding the wires to the die;
   (c) an inlet bore for receiving plasticized insulating material from an extruder, the longitudinal axis of said bore being at an angle to the longitudinal axes of the extrusion passages extending through the die;
   (d) an elongated top distribution channel extending above the full width of said sheet and having a longitudinal axis that is transverse to the longitudinal axes of the extrusion passages, said top distribution channel having an inlet opening at one end and an elongated outlet opening that extends at a downward angle from the inlet opening to the opposite end of the top distribution channel, the cross-sectional area of said top distribution channel gradually diminishing from the inlet opening to the opposite end thereof;
   (e) an elongated bottom distribution channel extending below the full width of said sheet and having a longitudinal axis that is transverse to the longitudinal axes of the extrusion passages, said bottom distribution channel having an inlet opening at one end and an elongated outlet opening that extends at an upward angle from the inlet opening to the opposite end of the bottom distribution channel, the cross-sectional area of the bottom distribution channel gradually diminishing from the inlet opening to the opposite end thereof;
   (f) an upper flow channel located above the full width of said sheet and having an inlet opening and an outlet opening that is connected to the inlet openings of the die passages;

(g) a lower flow channel located below the full width of said sheet and having an inlet opening and an outlet opening that is connected to the inlet openings of the die passages;

(h) a top feed bore connecting the inlet bore to the inlet opening of the top distribution channel;

(i) a bottom feed bore connecting the inlet bore to the inlet opening of the bottom distribution channel;

(j) a top flow compensating passage connecting the outlet opening of the top distribution channel to the inlet opening of the upper flow channel; and (k) a bottom flow compensating passage connecting the outlet opening of the bottom distribution channel to the inlet opening of the lower flow channel.

2. An extrusion crosshead as recited in claim 1, wherein each of said flow compensating passages and said flow channels have a generally flattened cross-section.

3. An extrusion crosshead as recited in claim 1, wherein each of said flow compensating passages extends in a plane which is substantially at a right angle to the plane of the wire sheet.

4. An extrusion crosshead as recited in claim 1, comprising heating means located adjacent each of the feed bores for selectively heating said bores.

5. An extrusion crosshead as recited in claim 1, wherein the die, inlet bore and feed bores are located within a die-block connected to the guide-block, the guide-block and die-block having opposing surfaces which lie substantially in a plane that is at a right angle to the plane of the wire sheet and transverse to the axes of the wires, said opposing surfaces being contoured to jointly form the distribution channels, flow channels and flow compensating passages.

6. An extrusion crosshead as recited in claim 5, wherein the die-block and guide-block are detachably connected.

7. An extrusion crosshead for encapsulating a sheet of parallel co-planar conductor wires with plastic insulating material, said extrusion head comprising:

(a) an extrusion die having a plurality of interconnected extrusion passages dimensioned to accommodate the sheet of conductor wires, each extrusion passage having an inlet opening to receive a conductor wire;

(b) a guide-block having a plurality of holes axially aligned with the die passages for receiving the wires and guiding the wires to the die;

(c) an inlet bore for receiving plasticized insulating material from an extruder, the longitudinal axis of said bore being at an angle to the longitudinal axes of the extrusion passages extending through the die;

(d) an elongated top distribution channel extending above the width of said sheet and having a longitudinal axis that is transverse to the longitudinal axes of the extrusion passages, said top distribution channel having an inlet opening at one end and an elongated outlet opening that extends from the inlet opening to the opposite end of the top distribution channel;

(e) an elongated bottom distribution channel extending below the width of said sheet and having a longitudinal axis that is transverse to the longitudinal axes of the extrusion passages, said bottom distribution channel having an inlet opening at one end and an elongated outlet opening that extends from the inlet opening to the opposite end of the bottom distribution channel;

(f) an upper flow channel located above the full width of said sheet and having an inlet opening and an outlet opening that is connected to the inlet openings of the die passages;

(g) a lower flow channel located below the full width of said sheet and having an inlet opening and an outlet opening that is connected to the inlet openings of the die passages;

(h) a top feed bore connecting the inlet bore to the inlet opening of the top distribution channel;

(i) a bottom feed bore connecting the inlet bore to the inlet opening of the bottom distribution channel;

(j) a top flow compensating passage connecting the outlet opening of the top distribution channel to the inlet opening of the upper flow channel, said top flow compensating passage lying in a plane that is substantially transverse to the plane of said sheet; and (k) a bottom flow compensating passage connecting the outlet opening of the bottom distribution channel to the inlet opening of the bottom flow channel, said bottom flow compensating passage lying in a plane that is substantially transverse to the plane of said sheet.

8. An extrusion crosshead as recited in claim 7, wherein the elongated outlet opening of the top distribution channel extends at a downward angle from its inlet opening and the elongated outlet opening of the bottom distribution channel extends at an upward angle from its inlet opening.

* * * * *